June 7, 1949.  L. M. GUNDEL  2,472,207
FISH LURE RETRIEVER
Filed May 6, 1944  2 Sheets-Sheet 1

Inventor
Louis M. Gundel
By George H. Loreh
Attorney

June 7, 1949. L. M. GUNDEL 2,472,207
FISH LURE RETRIEVER
Filed May 6, 1944 2 Sheets-Sheet 2
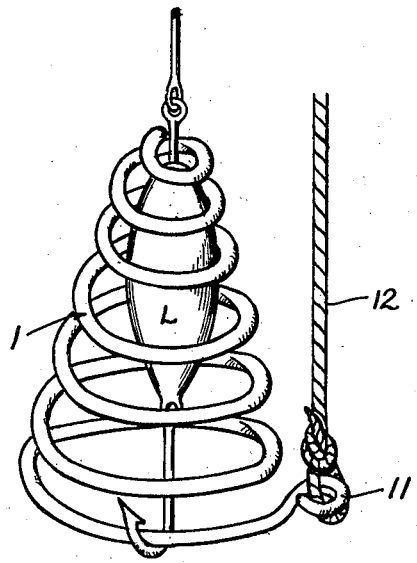
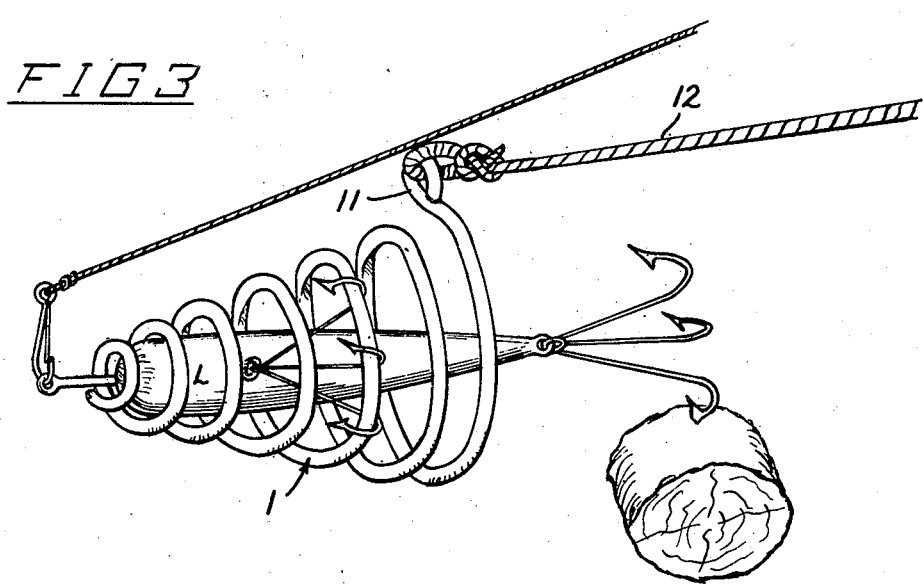
Inventor
LOUIS M. GUNDEL
By George H. Lorch
Attorney Patented June 7, 1949

2,472,207

UNITED STATES PATENT OFFICE 2,472,207

FISH LURE RETRIEVER

Louis M. Gundel, Chicago, Ill.

Application May 6, 1944, Serial No. 534,399

2 Claims. (Cl. 43—30)

This invention relates to a fish bait or lure retriever and has for its object the provision of a device of this character that is effective, inexpensive, and simple to use.

It is common knowledge among fishermen that many favorite and expensive lures are lost by becoming snagged or entangled in submerged objects such as rocks or sunken logs invariably too deep below the surface of the water to permit disengaging the lures by hand. This not only entails great inconvenience to the fisherman but also the loss of lures at a time when they cannot immediately be replaced and usually involves the loss of considerable line as well as time.

It is appreciated that several attempts have been made in the past to provide means, such as weights adapted to be slid down the line, for releasing snagged fish hooks but so far as is known none of these devices are successful or satisfactory and particularly not effective upon present day lures, which usually embody a multiplicity of hooks and devices for attracting the fish, projecting from various shaped bodies.

In accordance with this invention a fish lure retriever is provided that is inexpensive and simple to make and to use and yet is effective upon many if not all types of bait and artificial lures particularly the more elaborate ones presently in vogue and embodying a plurality of hooks as well as spoons or other attracting devices.

The exact nature of this invention will readily be understood from the drawings illustrating the preferred embodiment of this invention and in which:

Fig. 2 is a perspective illustrating how the retriever engages and releases one simple type of lure, and Fig. 3 is a similar view showing how the retriever engages a slightly different type of lure and also how a lure is retrieved when merely dropping the retriever upon the lure will not release it.

Figure 1:
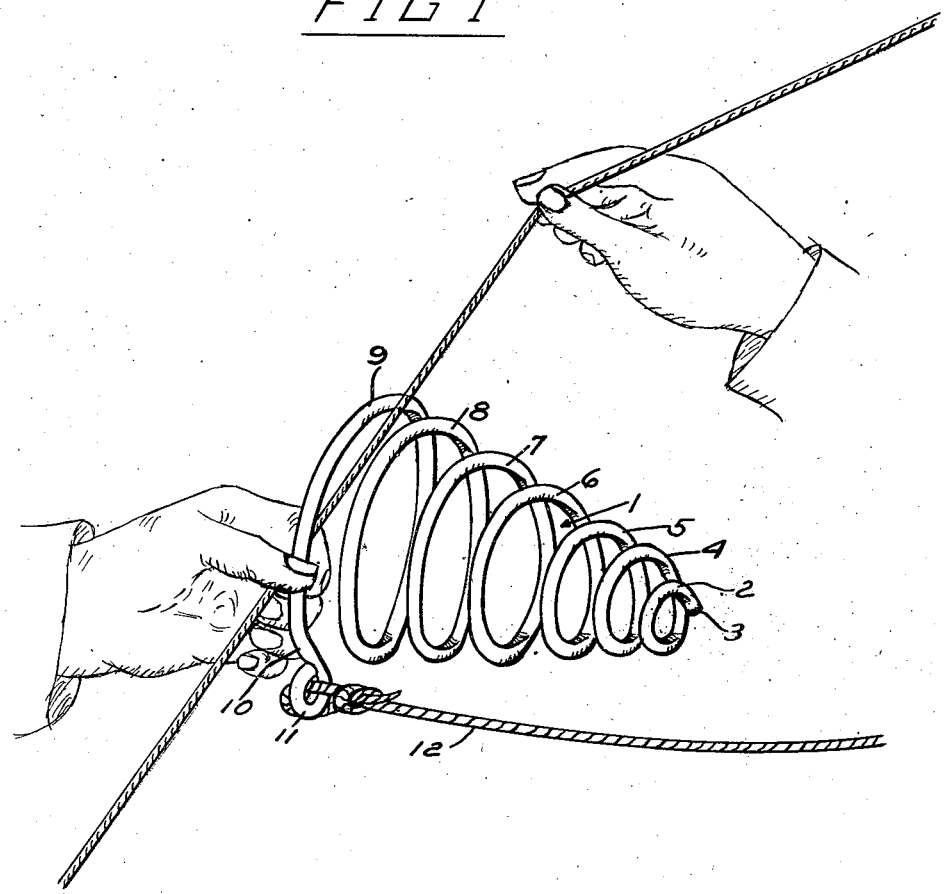
Fig. 1 is a perspective illustrating how a retriever embodying the principles of this invention is applied to a fish line that is attached to a lure or bait caught upon a submerged object.

From the drawings it will be seen that the fish lure retriever of this invention comprises a frusto-conical shaped cage formed from a single piece of spirally wound wire indicated generally by the reference character 1 and adapted to receive the fish line. The top coil or convolution 2 is small enough in diameter to prevent the lure L from passing therethrough and the upper end of the wire, i. e., the end adjacent the top coil may be deformed in some manner such as extended outwardly beyond the periphery of the coil as at 3 to prevent the line to the lure L from becoming disengaged and escaping from the retriever. The succeeding coils 4, 5, 6, 7, 8, and 9 are progressively greater in diameter so as to provide a cage shaped generally like a frustum of a cone. The other end of the wire, that is the lower end adjacent the bottom or largest coil 9 is also extended outwardly beyond the coil as at 10 where it is provided with an eye 11 or other means for attaching a pull cord 12 to the cage.

The number of convolutions or coils can be varied but it has been found that seven coils are satisfactory and effective to engage one or more of the hooks on most lures. As previously stated the upper coil 2 is sufficiently small to prevent passage of the smallest lure through the cage and the other coils increase in size so as to permit the retriever to pass over the larger or more elaborate lures including those having intermediate rotary blades and similar devices. By this construction a dislodging blow can be delivered to the lure L by dropping the retriever upon the top thereof. If the lure L is not so positioned that the top is engaged the same effect is obtained by the one or more of the coils engaging one or more of the hooks depending therefrom as is shown in Figs. 2 and 3.

In use when the fishing line is snagged it is slacked off and placed within the cage by winding or passing it through a tortuous path, i. e., between the convolutions as shown in Fig. 1. Once the line is engaged within the cage it is practically impossible for the line to come out of the cage because of the construction of the latter and the two extended ends 3 and 10. The cage with its return or pull cord 12 is then slid down the fishing line until it engages the lure L either by contacting the top of the lure or one or more of the hooks projecting from the lure. In most instances the dropping of the retriever upon the lure one or more times will free the lure so that the lure can be retrieved by pulling in either the fish line or the retriever pull cord.

In those instances where the foregoing technique does not free the lure L the pull cord of the retriever may be carried along the bank to another point or rowed to the opposite side of the obstruction and then pulled as illustrated in Fig. 3 to disengage the lure. Inasmuch as the lure is usually completely within the cage the lure can be retrieved in this manner in almost every situation without damage to the lure.

It will be apparent from the foregoing that this invention provides a simple, inexpensive, yet effective fish lure retriever. It also will be obvious to those skilled in the art that the specific embodiment of this invention shown by way of example only, may be modified without departing from the spirit and scope of this invention as defined in the appended claims.

Having described my invention I claim:

1. A fish lure retriever comprising a single piece of wire wound spirally in spaced convolutions to form a frusto-conical shaped wire cage adapted to receive a fish line therein by passing the latter between the convolutions of the cage, each end of said wire being extended beyond the periphery of the convolution adjacent thereto for preventing escape of the fish line from within said cage.

2. A fish lure retriever comprising a single piece of wire coiled to provide a frusto-conical spiral cage having the convolutions sufficiently spaced for the passage of a fish line therebetween whereby the line may extend longitudinally through the cage, and one end of the wire having an eye formed thereon for attachment of a pull cord, said frusto-conical form being adapted to house a fishing lure.

LOUIS M. GUNDEL.

REFERENCES CITED

The following references are of record in the file of this patent:

UNITED STATES PATENTS

| Number | Name | Date |
|---|---|---|
| 2,344,838 | Van Sickle | Mar. 21, 1944 |